(12) United States Patent
Lu et al.

(10) Patent No.: US 12,199,436 B2
(45) Date of Patent: Jan. 14, 2025

(54) MICRO-POWER WIND-SOLAR HYBRID ENERGY HARVESTING AND POWER GENERATING DEVICE, AND ENERGY HARVESTING METHOD

(71) Applicants: State Grid Jiangsu Electric Power Co., Ltd. Research Institute, Jiangsu (CN); STATE GRID JIANGSU ELECTRIC POWER CO., LTD., Jiangsu (CN); TAIZHOU POWER SUPPLY BRANCH OF STATE GRID JIANGSU ELECTRIC POWER CO., LTD., Jiangsu (CN); JIANGSU ELECTRIC POWER RESEARCH INSTITUTE CO., LTD., Jiangsu (CN)

(72) Inventors: Yongling Lu, Jiangsu (CN); Zhen Wang, Jiangsu (CN); Chengbo Hu, Jiangsu (CN); Jinggang Yang, Jiangsu (CN);

(Continued)

(73) Assignees: State Grid Jiangsu Electric Power Co., Ltd. Research Institute, Jiangsu (CN); STATE GRID JIANGSU ELECTRIC POWER CO., LTD., Jiangsu (CN); TAIZHOU POWER SUPPLY BRANCH OF STATE GRID JIANGSU ELECTRIC POWER CO., LTD., Jiangsu (CN); JIANGSU ELECTRIC POWER RESEARCH INSTITUTE CO., LTD., Jiangsu (CN)

(*) Notice: Subject to any disclaimer, the term of this patent is extended or adjusted under 35 U.S.C. 154(b) by 0 days.

(21) Appl. No.: 18/038,990

(22) PCT Filed: Oct. 11, 2022

(86) PCT No.: PCT/CN2022/124659
§ 371 (c)(1),
(2) Date: May 26, 2023

(87) PCT Pub. No.: WO2023/116135
PCT Pub. Date: Jun. 29, 2023

(65) Prior Publication Data
US 2024/0356335 A1    Oct. 24, 2024

(30) Foreign Application Priority Data
Dec. 24, 2021    (CN) .......................... 202111597090.3

(51) Int. Cl.
*H02S 10/12*    (2014.01)
*H02J 3/38*    (2006.01)
(Continued)

(52) U.S. Cl.
CPC .................. *H02J 3/38* (2013.01); *H02J 7/35* (2013.01); *H02N 2/186* (2013.01); *H02S 10/12* (2014.12); *H02J 7/345* (2013.01); *H02J 2207/50* (2020.01)

(58) Field of Classification Search
CPC ............ F03D 9/007; H02J 3/38; H02J 7/345; H02J 7/35; H02J 2207/50; H02N 2/186; H02N 2/188; H02S 10/12
See application file for complete search history.

(56) References Cited

U.S. PATENT DOCUMENTS

| 2008/0150286 A1* | 6/2008 | Fein ........................ F03D 9/255 |
| | | 290/55 |
| 2013/0009469 A1* | 1/2013 | Gillett ..................... H02J 3/381 |
| | | 307/25 |

(Continued)

FOREIGN PATENT DOCUMENTS

| CN | 101557117 | 10/2009 |
| CN | 103248266 | 8/2013 |

(Continued)

OTHER PUBLICATIONS

"International Search Report (Form PCT/ISA/210) of PCT/CN2022/124659," mailed on Jan. 11, 2023, with English translation thereof, pp. 1-4.

(Continued)

*Primary Examiner* — Levi Gannon
(74) *Attorney, Agent, or Firm* — JCIPRNET

(57) ABSTRACT

A micro-power wind-solar hybrid energy harvesting and power generating device including a solar power generation (Continued)

module, a wind power generation module, a control module, an energy storage module, and an accessory structure are provided. The solar power generation module is mainly composed of a solar thin film cell and a corresponding interface control circuit, and the wind power generation module includes a wind-induced vibration structure, a cantilever beam structure, a piezoelectric element, and a corresponding interface control circuit. The solar thin film cell is mounted at a top of the wind-induced vibration structure, and interface control circuits, the energy storage module, etc. are all arranged inside the wind-induced vibration structure. The control module is configured to handle an energy harvesting and power generating algorithm of the wind-solar hybrid power generating device to maximize the power generation quality and the power generation efficiency of the device.

12 Claims, 7 Drawing Sheets

(72) Inventors: Jun Jia, Jiangsu (CN); Guojiang Zhang, Jiangsu (CN); Rong Sun, Jiangsu (CN); Hui Fu, Jiangsu (CN); Rushan Wang, Jiangsu (CN); Ting Chen, Jiangsu (CN); Nan Yao, Jiangsu (CN); Ziquan Liu, Jiangsu (CN); Xueqiong Zhu, Jiangsu (CN); Hai Xue, Jiangsu (CN)

(51) Int. Cl.
*H02J 7/35* (2006.01)
*H02N 2/18* (2006.01)
*H02J 7/34* (2006.01)

(56) References Cited

U.S. PATENT DOCUMENTS

| | | | | |
|---|---|---|---|---|
| 2013/0264829 | A1* | 10/2013 | Jordan, Sr. | F03D 9/25 290/55 |
| 2016/0025067 | A1* | 1/2016 | Pristash | F03D 3/0427 290/55 |
| 2016/0099570 | A1* | 4/2016 | The' | H02J 7/35 307/72 |
| 2017/0096985 | A1* | 4/2017 | Bardia | H02K 7/183 |

FOREIGN PATENT DOCUMENTS

| | | |
|---|---|---|
| CN | 103944180 | 7/2014 |
| CN | 104467818 | 3/2015 |
| CN | 111766905 | 10/2020 |
| CN | 112258688 | 1/2021 |
| CN | 112751506 | 5/2021 |
| CN | 114421854 | 4/2022 |
| JP | 2002366072 | 12/2002 |

OTHER PUBLICATIONS

"Written Opinion of the International Searching Authority (Form PCT/ISA/237) of PCT/CN2022/124659," mailed on Jan. 11, 2023, pp. 1-5.

* cited by examiner

MICRO-POWER WIND-SOLAR HYBRID ENERGY HARVESTING AND POWER GENERATING DEVICE, AND ENERGY HARVESTING METHOD

CROSS-REFERENCE TO RELATED APPLICATION

This application is a 371 of international application of PCT application serial no. PCT/CN2022/124659, filed on Oct. 11, 2022, which claims the priority benefit of China application no. 202111597090.3, filed on Dec. 24, 2021. The entirety of each of the above-mentioned patent applications is hereby incorporated by reference herein and made a part of this specification.

BACKGROUND

Technical Field

The present invention relates to the technical field of environmental energy collection, and in particular to a micro-power wind-solar hybrid energy harvesting and power generating device, and an energy harvesting method.

Description of Related Art

A large batch of hot spot terms, such as 5G, the Internet of Things and artificial intelligence appear continuously in today's world, and the hardware basis of these technologies is a large amount of independent intelligent electronic equipment. Unfortunately, while technologies such as integrated circuits and wireless communications develop quickly, the power supply technology of independent equipment is still relatively developed slowly, which restricts rapid deployment of various emerging technologies. Taking a state sensing monitoring network of a power device as an example, how to provide a stable and reliable power supply for state monitoring nodes of devices such as overhead lines and towers in a field complex environment is still one of the key factors restricting the development of the perception network.

An environmental energy collection technology is developed to acquire energy from a surrounding environment of a sensing node and supply power thereto, which is a relatively feasible technical solution. Similarly, taking a power apparatus state sensing node arranged in a field as an example, wind energy and solar energy in the environment are most common, and are the energy taking sources firstly considered. In particular, solar energy collection has currently been subjected to pilot application on some sensing nodes, but in a continuous cloudy and rainy weather, the self-powered sensing node often does not work because reserve power is exhausted. For a miniature wind power generating device, if a classical rotary cutting magnetic induction line is used for power generation, due to unbalanced rotation introduced by uneven mass distribution, structures such as a bearing and a blade are likely to be damaged, and a service life is affected Based on the above reasons, a wind power generating device utilizing vortex-induced vibration is put forward, and the structure avoids the design of a rotating component, and has an extremely high service life and operation stability in a micro device. Meanwhile, in order to improve generation power of an independent system, some researchers also propose a wind-solar hybrid energy harvesting and power generating device based on vortex-induced vibration and solar energy. For these hybrid energy harvesting devices, two energy sources are just simply stacked, while a power generation effect is higher than that of an energy harvesting device of a single energy source, the obtained overall income generally does not exceed the superimposed power of the two energy sources after such two energy sources separately harvest energy, which lies in that in the hybrid energy harvesting device, a wind power generating device tends to have a movable characteristic, while a solar power generating device tends to have a static characteristic. There are few technical solutions for how to effectively coordinate this pair of contradictions in the same device at present.

SUMMARY

An objective of the present invention is to provide a micro-power wind-solar hybrid energy harvesting and power generating device, and an energy harvesting method, which switch working roles, namely vibration energy power generation or vibration suppression, of a piezoelectric element by means of a key electromechanical coupling element, namely the piezoelectric element, thereby effectively coordinating a pair of contradictions, namely a movable characteristic of wind power generation and a static characteristic of solar power generation in the same device, and maximizing the power generation quality and the power generation efficiency of the micro-power power generating device.

In order to achieve the above objective, the present invention employs the technical solutions as follows:

A micro-power wind-solar hybrid energy harvesting and power generating device includes a solar power generation module, a wind power generation module, a control module, an energy storage module, and an accessory structure.

The wind power generation module includes a piezoelectric element, a wind-induced vibration structure in a hollow blunt body form, and a wind-induced vibration structure interface control circuit, the piezoelectric element is connected to the wind-induced vibration structure interface control circuit by means of positive and negative wires.

The solar power generation module includes a solar cell and a solar cell interface control circuit connected thereto.

The wind-induced vibration structure interface control circuit and the solar cell interface control circuit are both connected to the energy storage module, and the energy storage module is configured to store electric energy generated by the solar power generation module and the wind power generation module.

The solar cell is mounted on a surface of the wind-induced vibration structure, and the wind-induced vibration structure interface control circuit, the solar cell interface control circuit, the control module and the energy storage module are all mounted inside the wind-induced vibration structure.

The accessory structure is configured to fixedly mount the hybrid energy harvesting and power generating device on an overhead transmission line tower.

The control module is connected to the energy storage module and the wind-induced vibration structure interface control circuit, and the control module is configured to control a working mode of the piezoelectric element.

Furthermore, the solar cell is a solar thin film cell.

Furthermore, the wind power generation module further includes a cantilever beam structure.

The wind-induced vibration structure and a free end of the cantilever beam structure are connected and fixed, and the piezoelectric element is arranged at a clamping end of the cantilever beam structure and is adhered and integrated on a surface of the cantilever beam structure in an adhesive manner.

Furthermore, the accessory structure includes a wind vane, a rotating mechanism and a clamping and fixing mechanism.

The wind vane and the rotating mechanism are configured to make a neutral surface of a cantilever beam always parallel to an incoming flow direction.

The clamping and fixing mechanism is connected to the cantilever beam structure, and the clamping and fixing mechanism is configured to fixedly mount the cantilever beam structure on the overhead transmission line tower.

Furthermore, a cross section of the wind-induced vibration structure in the hollow blunt body form employs any one of the following forms: a circle, a square, a rectangle and a semicircle.

Furthermore, the solar thin film cell is mounted on a top plane and/or a side curved surface of the wind-induced vibration structure.

Furthermore, the energy storage module is of a rechargeable battery.

Furthermore, the energy storage module is of a supercapacitor, and the supercapacitor performs standard voltage output by means of a DC/DC voltage regulator.

Furthermore, the wind-induced vibration structure interface control circuit includes an energy control switch I and a transformer which are connected in series, and the piezoelectric element forms a series loop with the energy control switch I and the transformer by means of positive and negative wires.

A secondary side of the transformer is connected to the energy storage module, and the energy storage module includes an energy control switch II and the supercapacitor connected in series.

Furthermore, the control module is specifically configured to:
  switch voltage phases of the piezoelectric element by controlling the energy control switch I and the energy control switch II, such that the piezoelectric element achieves switching between an energy collection mode and a mode of suppressing vibration of the wind-induced vibration power generation structure.

An energy harvesting method of the micro-power wind-solar hybrid energy harvesting and power generating device includes:
  controlling the energy control switch I and the energy control switch II to be turned on, such that the piezoelectric element is switched to the energy collection mode, and extracting and storing electric energy of the wind power generation module by means of an electromechanical coupling effect of the piezoelectric element;
  controlling the energy control switch I to be turned on, and controlling the energy control switch II to be turned off, such that the voltage phase of the piezoelectric element jumps by 180°, and the piezoelectric element is switched into the mode of suppressing vibration of the wind-induced vibration power generation structure; and extracting and storing electric energy of the solar power generation module by means of the solar cell interface control circuit.

Furthermore, the solar cell interface control circuit extracts the electric energy by using a maximum power point tracking algorithm and stores the electric energy in the energy storage module.

Furthermore, the wind-induced vibration structure interface control circuit extracts the electric energy by using a synchronous charge extraction algorithm and stores the electric energy in the energy storage module.

The present invention has the following beneficial effects.

According to the micro-power wind-solar hybrid energy harvesting and power generating device and the harvesting algorithm provided by the present invention, basic characteristics of solar power generation and wind-induced vibration power generation in the same device are effectively considered, and the piezoelectric element in the structure and the corresponding interface control circuit are ingeniously utilized, such that the defect that the output electric power of a micro-power solar power generating device is 0 at night or in a continuously cloudy and rainy weather is effectively overcome, it is ensured that the energy harvesting and power generating system always has the electric power outputting capability, the design difficulty of an energy storage module of an independent power supply system is greatly reduced, and the environment survivability of the device is improved. In addition, when the solar power generation module occupies a main position to start working, the vibration suppression function of the piezoelectric element effectively improves the stability of the output electric power of solar power generation, reduces the design difficulty of the interface control circuit, and further improves the power generation efficiency. By means of the method, the power generation quality and the power generation efficiency of the micro-power wind-solar hybrid energy harvesting and power generating device are maximized.

DESCRIPTION OF THE EMBODIMENTS

Figure 1:
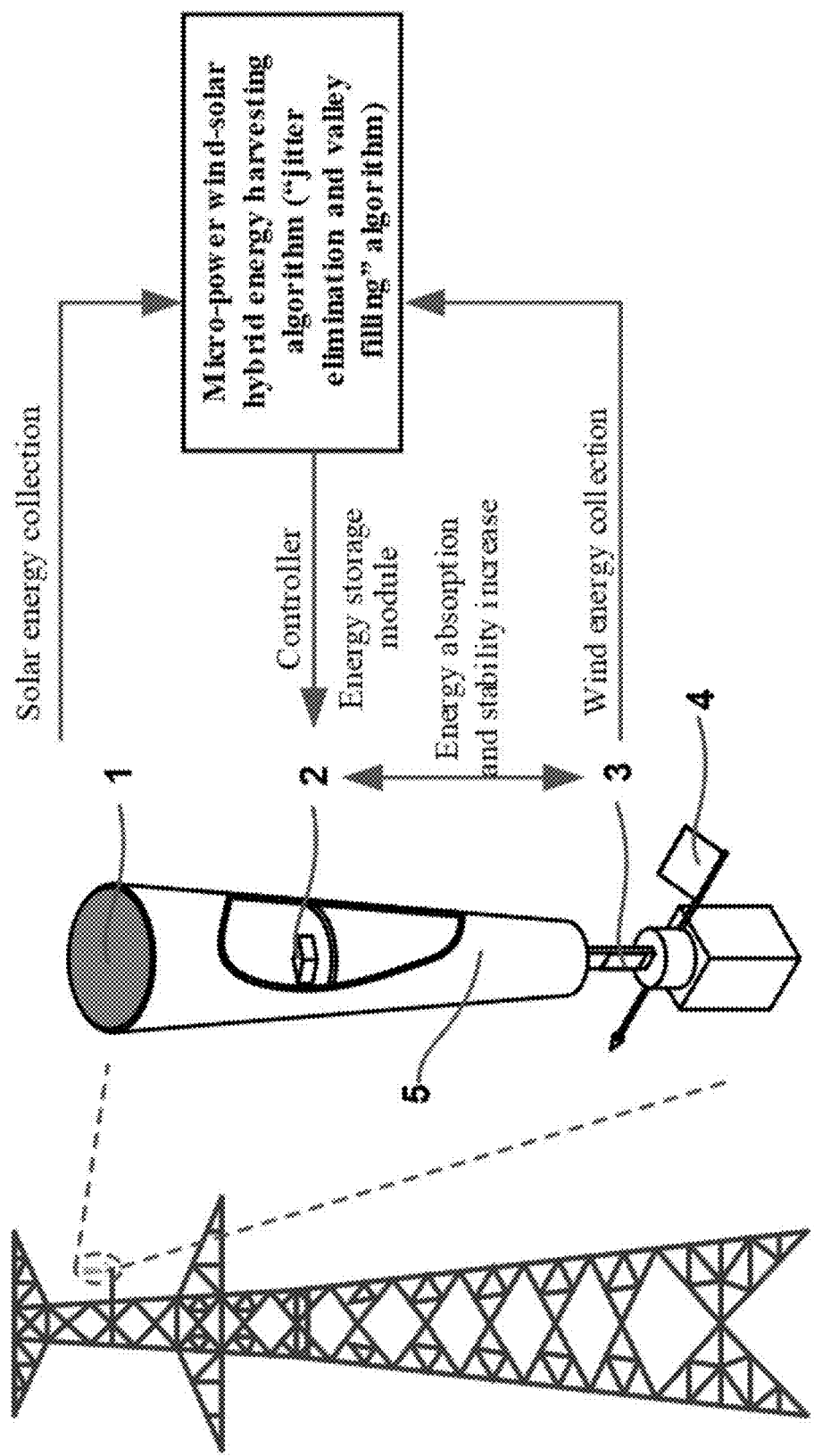
FIG. 1 is a schematic diagram for an application scenario of a micro-power wind-solar hybrid energy harvesting and power generating device provided by an example of the present invention.

In order to make those skilled in the art better understand the technical solution of the present invention, the present invention is further described in detail below with reference to the accompanying drawings and particular embodiments. The embodiments of the present invention will be described in detail below, examples of the embodiments are shown in accompanying drawings, throughout which identical or similar reference numerals denote identical or similar elements or elements having identical or similar functions. The embodiments described below with reference to the accompanying drawings are exemplary and are merely used to explain the present invention, but cannot be interpreted as limiting the present invention. It can be understood by those skilled in the art that singular forms "a/an", "one", "said" and "the" used herein may also include plural forms unless expressly stated. It should be further understood that the word "comprise/include" used in the description of the present invention means presence of stated features, integers, steps, operations, elements and/or components, but does not exclude the presence or addition of one or more other features, integers, steps, operations, elements, components and/or groups thereof. It should be understood that words "and/or" as used herein includes any unit and all combinations of one or more associated listed items. It can be understood by those skilled in the art that unless otherwise defined, all terms (including technical terms and scientific terms) used herein have the same meanings as those generally understood by those skilled in the art to which the present invention belongs. It should also be understood that terms such as those defined in a general dictionary should be understood to have meanings consistent with those in the context of the prior and will not be interpreted in idealized or overly formal meanings unless specifically defined as herein.

An example of the present invention provides a micro-power wind-solar hybrid energy harvesting and power generating device. The device includes a micro-power solar power generation module 1, a micro-power wind power generation module, a micro-power wind-solar hybrid energy harvesting control module, an energy storage module 2, and an accessory structure 4 of the device as shown in FIG. 1 and FIG. 2.

The micro-power solar power generation module 1 is mainly composed of a solar thin film cell and a corresponding interface control circuit, and the micro-power wind power generation module includes a wind-induced vibration structure 5, a cantilever beam structure, a piezoelectric element 3, and an interface control circuit of the wind-induced vibration structure. The micro-power wind-solar hybrid energy harvesting control module is mainly used for handling an energy harvesting and power generating algorithm of the independent wind-solar hybrid power generating device so as to maximize the power generation quality and the power generation efficiency of the device and optimize a power supply missing rate of the system. The energy storage module 2 is composed of a rechargeable battery or a supercapacitor and is used for storing a proper amount of electric energy to ensure that the power supply system may stably and reliably operate, and the accessory structure 4 of the device is mainly composed of a wind vane, a rotating mechanism, a clamping and fixing mechanism, etc.

Specifically, the wind-induced vibration structure 5 and a free end of the cantilever beam structure are fixedly connected together, the piezoelectric element is close to the clamping end of the cantilever beam structure and is adhered and integrated on a surface of the cantilever beam in an adhesive manner, the cantilever beam clamping end is connected to the accessory structure 4 by means of the clamping and fixing mechanism in the accessory structure 4 of the device, and the accessory structure 4 is fixed on an overhead transmission line tower by means of accessories such as angle iron and bolts. The piezoelectric element 3 is connected to the interface control circuit by means of positive and negative wires, and an output voltage and current of the piezoelectric element are adjusted in real time by means of the interface control circuit according to a required algorithm, thereby achieving conversion of functions of the piezoelectric element.

Figure 2:
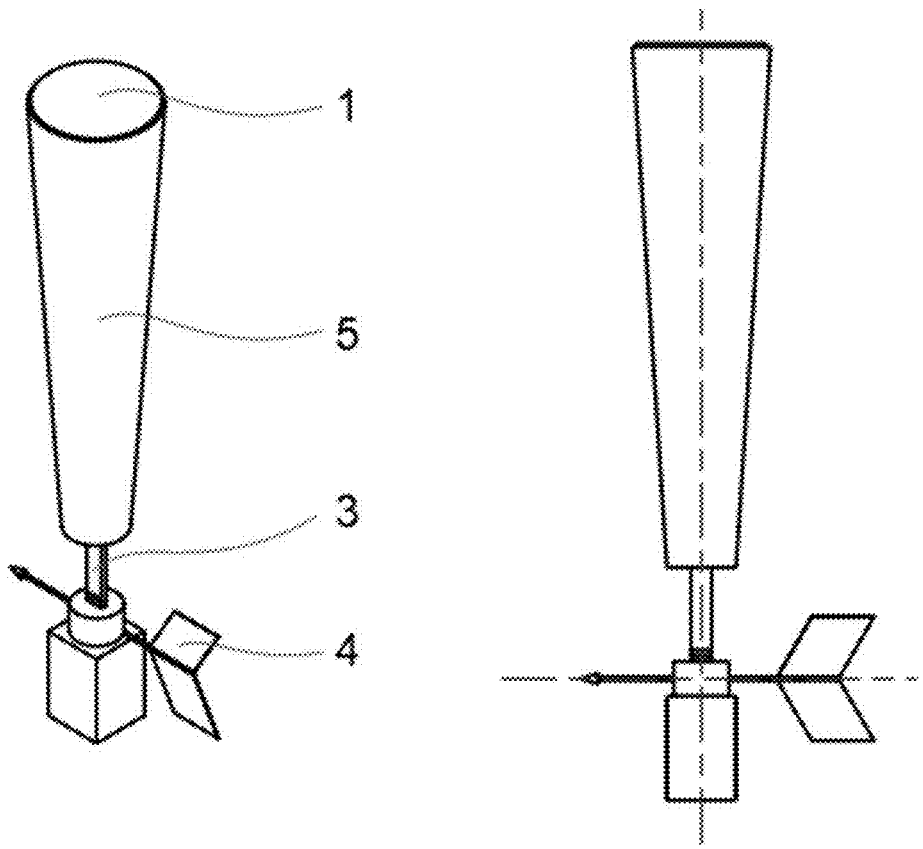
FIG. 2 is a schematic structural diagram of a micro-power wind-solar hybrid energy harvesting and power generating device provided by an example of the present invention.

Specifically, the wind-induced vibration structure 5 is a core component of the micro-power wind-solar hybrid energy harvesting and power generating device, and is designed to be in the form of an internal hollow bluff body, as shown in FIG. 2. When an air flow field, namely wind blows through the bluff body, the bluff body structure generally generates vortex-induced vibration and other phenomena, that is, a periodic alternate shedding tail vortex is generated behind the bluff body, and the bluff body structure is also called a Karman vortex street. Research shows that alternate shedding of the Karman vortex street alternately will cause structural vibration, and if a shedding frequency is close to an inherent frequency of the structure, a resonance phenomenon also occurs, such that the piezoelectric element in the structure generates periodically changing strain energy, and finally electric energy is generated by means of a direct piezoelectric effect. The wind-induced vibration power generation herein is implemented based on the above principle.

Generally, there is no special requirement for a material of the bluff body, and the metal material such as stainless steel and aluminum alloy, plastic, or even carbon fiber reinforced resin group and other anti-aging materials which have certain rigidity, and are not easy to deform may be selected.

Figure 3:
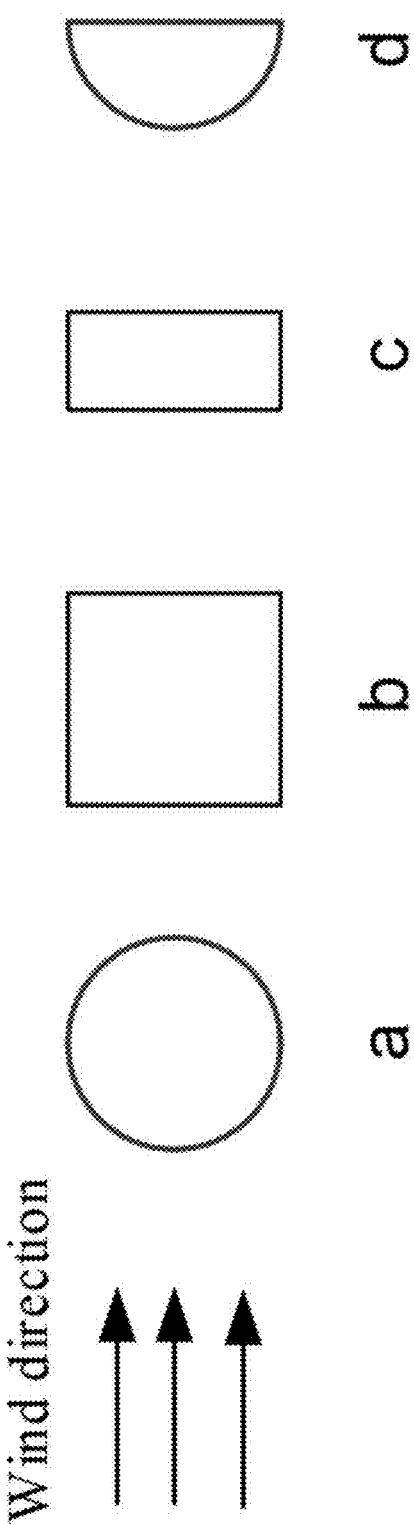
FIG. 3 is a schematic diagram of a cross section of a wind-induced vibration structure provided by an example of the present invention.

Furthermore, in addition to being circular, the shape of a cross section of the bluff body may also be a square, a rectangle, a semicircular shape, etc. as shown in FIG. 3, and the bluff body formed by machining such a cross section may generate the vortex-induced vibration phenomenon, such that the form of the wind-induced vibration structure 5 is not unique. It should be noted that an interior of such a bluff body structure should be designed in a hollow or partially hollow form, such that the structural quality may be reduced, the matching design of the inherent frequency of the structure is satisfied, and moreover, the equivalent mass of the structure is reduced; and furthermore, modules such as the energy storage module and the interface control circuit may be arranged inside the structure, such that the compactness, reliability and working stability of the structure of the device are greatly improved.

In order to further optimize the design of the device, the micro-power solar power generation module based on photoelectric effect power generation selects a solar thin film cell which is as thin and light as possible, and the solar thin film cell may be mounted outside the wind-induced vibration structure 5, and includes a top plane and a side curved surface, and the interface control circuit for extracting the electric energy generated by the photovoltaic effect is also arranged inside the wind-induced vibration structure. The above design also greatly simplifies the mounting difficulty of the power generating device, and may be conveniently mounted in a typical application scenario, for example, applied to a power supply system of a sensing device related to a power transmission line tower.

The accessory structure of the wind-induced vibration structure includes a wind vane, a rotating mechanism, a clamping and fixing mechanism, and the design of the wind vane and the rotating mechanism may make a neutral surface of a cantilever beam to be always parallel to an incoming flow direction. When the wind-induced vibration structure vibrates, the degree of freedom of a structural vibration direction is always parallel to a pressure change direction generated by vortex shedding, such that the structural vibration is easier to occur, and power generation is facilitated by using wind energy in the environment. On one hand, the clamping and fixing mechanism is configured to connect the cantilever beam structure, and on the other hand, the clamping and fixing mechanism is configured to be fixedly connecting the whole device to the overhead transmission line tower.

In the example, the most suitable mounting position of the hybrid energy harvesting and power generating device is the overhead transmission line tower, and is generally mounted and fixed in a middle upper portion of the tower by using angle iron and bolts.

The working principle of the micro-power wind-solar hybrid energy harvesting and power generating device is as follows: during an illumination time period, solar power generation plays a dominant role, and the piezoelectric element for energy conversion on a cantilever beam and fixedly connected to the wind-induced vibration structure is designed to suppress structural vibration, that is, a voltage phase at two ends of an electrode of the piezoelectric element are changed in real time by means of the interface control circuit, such that the piezoelectric element not only converts part of mechanical energy into electric energy by means of electromechanical coupling conversion, but also the electric energy is fed back to the piezoelectric element to generate suppression force to reduce the structural amplitude, thereby reducing or eliminating the fluctuation of the solar power generation output power, and achieving a "jitter elimination" effect on the hybrid energy harvesting and power generating device. During a time period of poor illumination conditions or weak illumination, the solar power generation module fails to output the electric power, in this case, the interface control circuit is mainly used for extracting the electric energy converted by the piezoelectric element by means of electromechanical coupling, and no extra structural vibration suppression force is generated any more, such that the piezoelectric element is mainly used for converting vibration energy to electric energy, wind energy in the environment is converted into electric energy by means of the wind-induced vibration structure, and it is ensured that the wind-light hybrid energy harvesting and power generating device still has a certain output electric power, thereby playing a role in "valley filling" for the whole hybrid energy harvesting and power generating device.

Specifically, the wind-light hybrid energy harvesting and power generating device is arranged in an open field, for example, the wind-light hybrid energy harvesting and power generating device is used for supplying power to a sensing device around a power grid transmission line tower, and the energy harvesting and power generating device may be roughly divided into two working time periods: an illumination time period and a time period of poor illumination conditions or weak illumination. The illumination time period generally refers to daytime with relatively good illumination conditions, and the time period of poor illumination conditions or weak illumination generally refers to night or cloudy and rainy days. During the daytime with relatively good illumination conditions, the wind-light hybrid energy harvesting and power generating device selects to use the solar power generation module for power generation. The solar thin film cell integrated at the top of the wind-induced vibration structure generates power according to the basic working principle of the photovoltaic effect, and the matching interface control circuit efficiently extracts and stores the electric energy in the energy storage module according to a certain electric energy extraction algorithm, such as a maximum power point tracking algorithm. The energy storage module is provided with a rechargeable battery or a supercapacitor. If the rechargeable battery is selected, a charging end circuit is relatively complex, and an appropriate charging rate, charging voltage, etc. need to be selected according to the characteristics of the rechargeable battery, and the extracted electric energy is efficiently stored. If the supercapacitor is selected, a charging end circuit is relatively simple according to the charging and discharging characteristics of the supercapacitor, but a subsequent voltage stabilizing output end circuit is relatively complex, and a DC/DC voltage regulator is generally selected to achieve a standard voltage output. However, for a self-powered passive sensing system, if the ambient energy harvesting and power generating power approaches the consumed power of the system, and the storage voltage is near a minimum input voltage of the voltage regulator, the power management module may have an unstable output phenomenon, which may cause damage to the passive sensing device. To this end, an under-voltage protection circuit should also be designed for the DC/DC voltage regulator to ensure that once the system works, the system may stably operate for a certain period of time by means of continuous and stable power supply of the voltage regulator.

During the time period of poor illumination conditions or weak illumination, such as during continuously cloudy and rainy days or at night, the wind-solar hybrid energy harvesting and power generating device achieves power generation which mainly depends on wind energy, that is, the structure vibrate greatly by means of the periodic vortex shedding phenomenon due to the fact that wind blows through the wind-induced vibration structure, and finally power generation is achieved by means of the electromechanical coupling effect (i.e. the direct piezoelectric effect) of the piezoelectric element, and the matching interface control circuit also efficiently stores the electric energy in the energy storage module according to a certain electric energy extraction algorithm, such as a synchronous charge extraction algorithm. The energy storage module may also be of a rechargeable battery or a supercapacitor. If the rechargeable battery is selected, a charging end circuit is relatively complex, and an appropriate charging rate needs to be selected according to the characteristics of the rechargeable battery, and the extracted electric energy is efficiently stored. If the supercapacitor is selected, a charging end circuit is relatively simple according to the characteristics of the supercapacitor, but a subsequent voltage stabilizing output end circuit is relatively complex, and a DC/DC voltage regulator is generally selected to achieve a standard voltage output. Similarly, an under-voltage protection circuit should also be designed for the DC/DC voltage regulator to ensure that once the system works, the system may stably operate for a certain period of time by means of continuous and stable power supply of the voltage regulator.

It should be noted that since the basic principles of solar power generation and wind power generation are different, the working principles of the employed electric energy extraction interface control circuits are also different. The interface control circuit of the micro-power solar power generation module generally employs a simple maximum power point tracking algorithm such as an open-circuit voltage method or a short-circuit current method to generally identify the maximum power which may be output by the solar thin film cell, and then the electric energy is stored by means of the interface control circuit. A synchronous charge extraction interface control algorithm is selected for the micro-power wind power generation module based on the piezoelectric element, and when charge energy stored in the piezoelectric element reaches the maximum value, all the charge energy may be extracted at a time and is temporarily stored by means of an inductance element in the interface control circuit, and then is injected into the subsequent energy storage module.

Compared with solar energy, the time period during which wind energy exists in the environment is wider, such that the defect that power generation power is 0 when the solar power generation module does not work may be effectively overcome by harvesting the wind energy and generating power, which is equivalent to achieving a "valley filling" effect, finally the power generation power of the whole device is improved, moreover, a power supply missing rate is optimized, and the design difficulty of the energy storage module is reduced.

Figure 4:
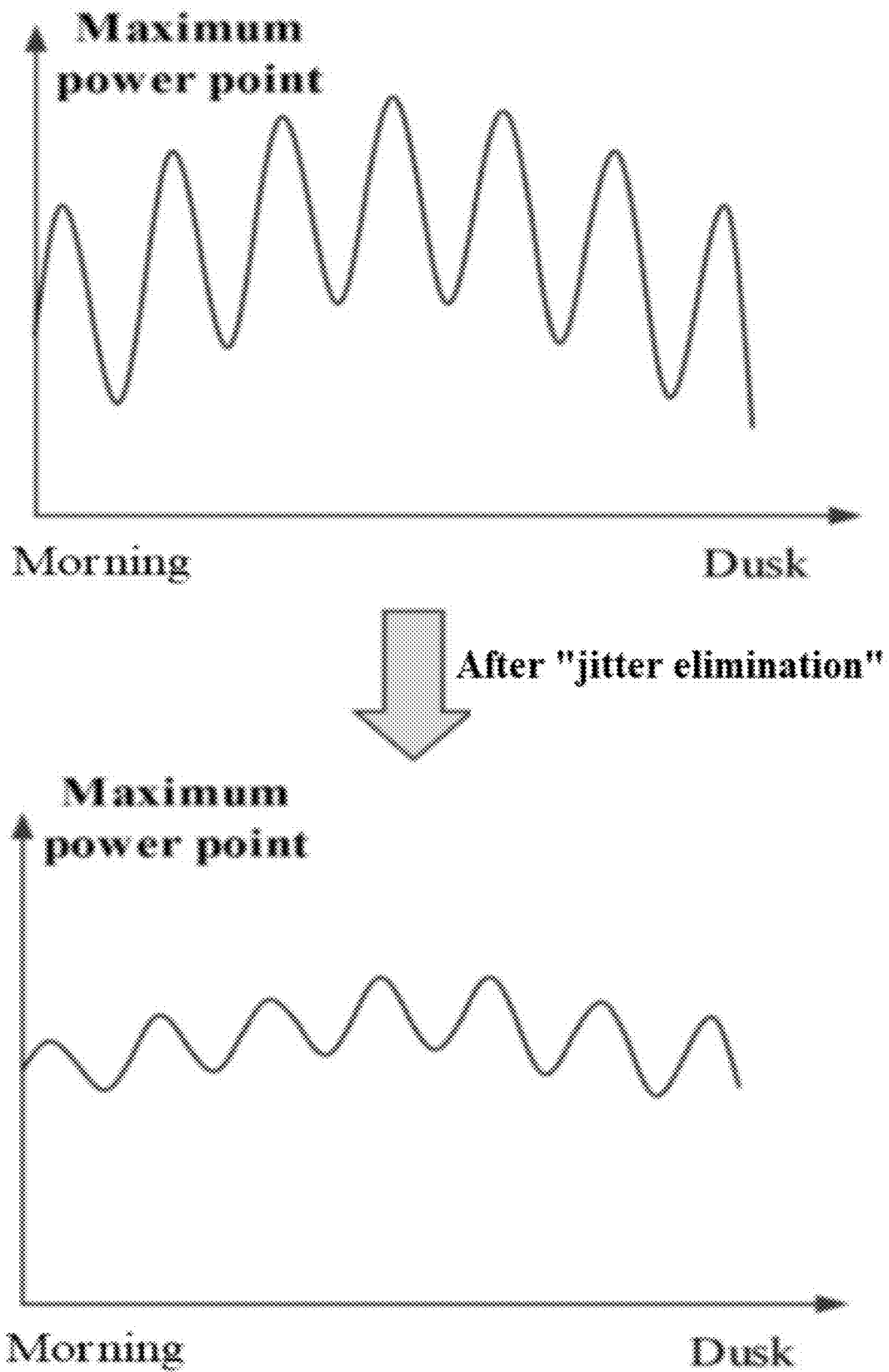
FIG. 4 shows schematic diagrams of the maximum output power of a solar power generation module before and after vibration of a suppression structure of a piezoelectric element in a micro-power wind-solar hybrid energy harvesting and power generating device provided by an example of the present invention.

Furthermore, in the illumination time period, the output power of the solar power generation is likely to be influenced by an illumination intensity and an illumination area, and the wind-induced vibration structure is extremely likely to vibrate under the wind condition, such that the solar thin film cell vibrates along with the fixed structure, which may cause periodic oscillation of an equivalent illumination area. Furthermore, the maximum power point tracking algorithm of the interface control circuit may not be designed to be complex due to the micro-power solar power generation, which lies in that effective achievement fails to reach, and a complex interface control circuit will also consume more electric energy, which does not conform to the basic working principle of the micro-power wind-solar hybrid energy harvesting and power generating device. Based on the above idea, the present invention takes measures from the source, eliminates or reduces the structural oscillation, thereby suppressing the fluctuation of the output power of the solar power generation. By means of the interface control circuit, switching of the structural vibration suppression function is achieved, the amplitude of the wind-induced vibration structure is greatly reduced, the fluctuation of the maximum power point of the solar power generation is no longer obvious, and the quality of the micro-power solar power generation is improved, which is equivalent to achieving a "jitter elimination" effect, such that the interface circuit with the maximum power point tracking control selected is less likely to generate oscillation power, and the overall output electric power of the system is improved as shown in FIG. 4.

Figure 5:
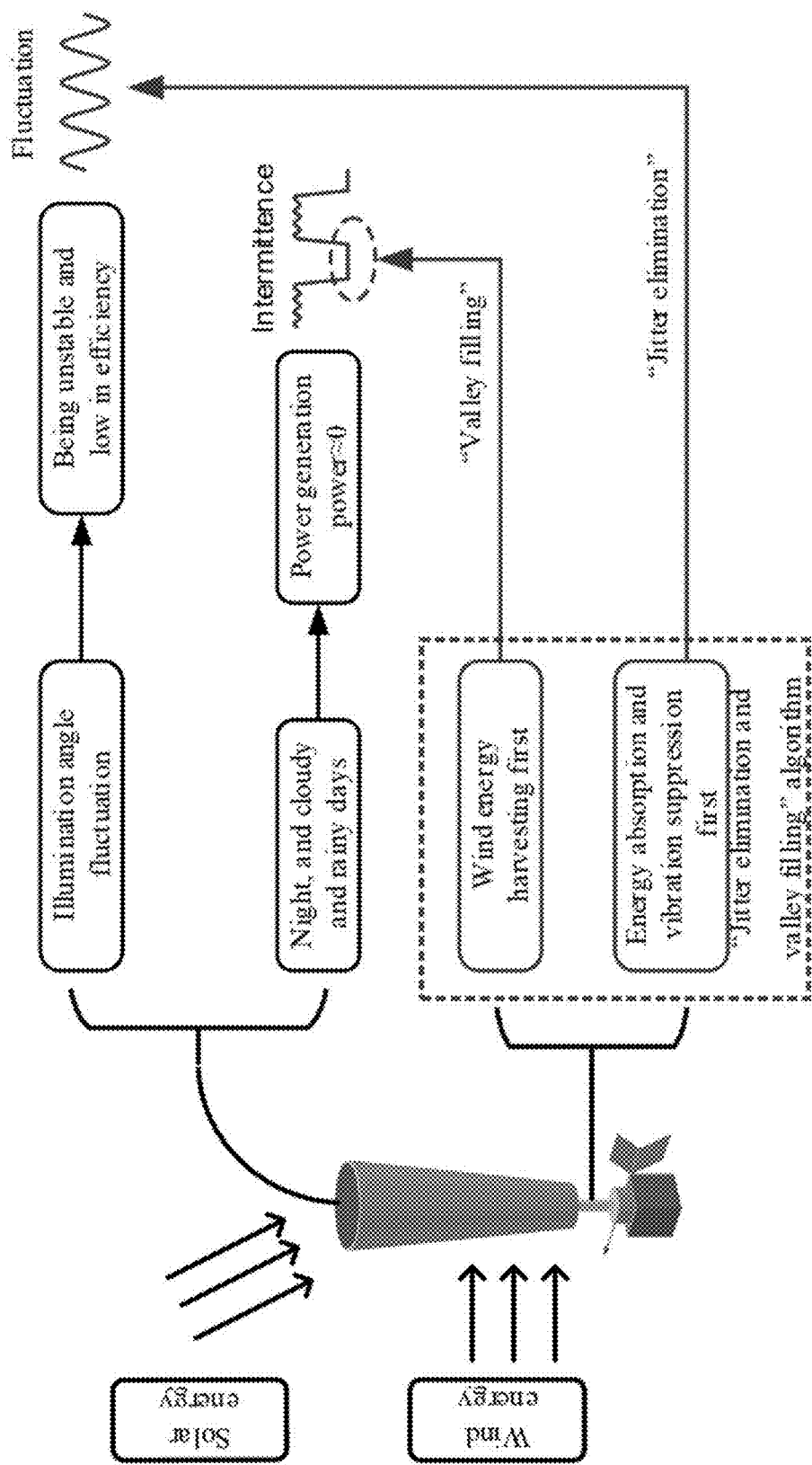
FIG. 5 is a schematic diagram of a micro-power wind-solar hybrid energy harvesting algorithm provided by an example of the present invention.

Based on this, the present invention designs a core hybrid energy harvesting algorithm for the micro-power wind-solar hybrid energy harvesting and power generating device. As shown in FIG. 5, by timely switching the working roles of the piezoelectric element in the structure, "jigger elimination" and "valley filling" of the output electric power by the power generating device are achieved, thereby effectively coordinating a pair of contradictions, namely a movable characteristic of the wind power generation and a static characteristic of the solar power generation, in the same device, and maximizing the power generation efficiency of the micro-power power generating device.

Figure 6:
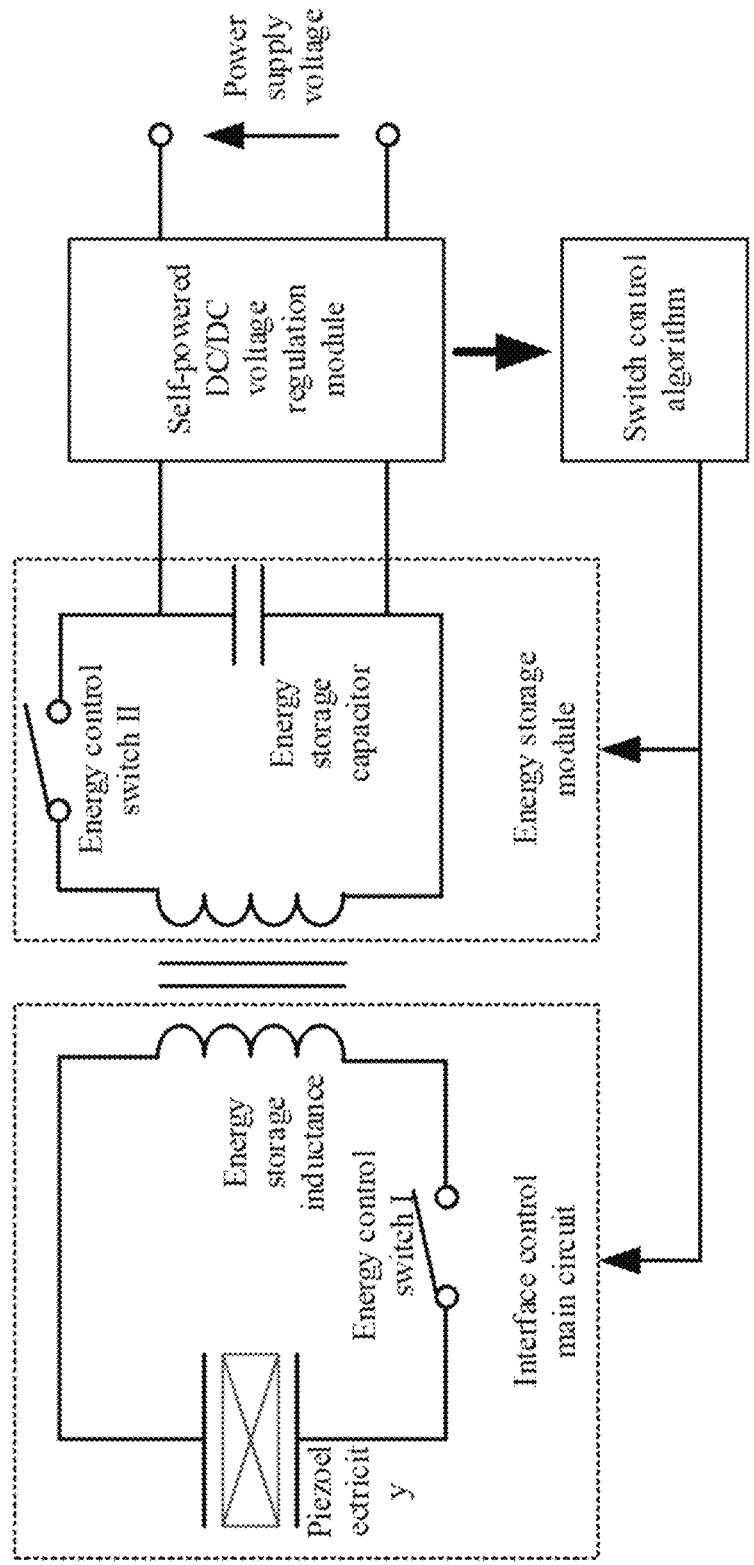
FIG. 6 is a working principle diagram of a piezoelectric element and an interface control circuit of a wind-induced vibration structure provided by an example of the present invention.

Specifically, the core of the algorithm is to timely switch the working roles, namely the wind-induced vibration energy collection role or the structural vibration suppression role, of the piezoelectric element in the wind-induced vibration structure. Switching is mainly achieved by means of an interface control circuit composed of a transformer and a corresponding energy control switch I. With reference to FIG. 6, the piezoelectric element is connected to the interface control circuit 3 by means of positive and negative wires, and the energy storage module is composed of an energy storage capacitor, an energy control switch II and a secondary side of the transformer.

The piezoelectric element may convert mechanical vibration energy into electric energy, which means energy loss for a mechanical vibration system, that is, the piezoelectric element achieves an effect of "electrical damping". When the electrical damping does not have an obvious effect, it may be considered that the collected electric energy does not affect the structural vibration, and when the electrical damping plays an obvious role, the collected electric energy reduces the amplitude of the system, i.e. having a vibration suppression effect.

When the piezoelectric element works in a structural vibration control and energy collection frequency band, the piezoelectric element itself may be equivalent to a capacitor, and a primary side winding of the transformer in the interface control circuit is equivalent to an inductor. As shown in FIG. 6, the energy control switch I and an energy control switch II are controlled by the control module, and when the energy control switch I is turned on, the piezoelectric element and the primary side winding of the transformer will form a classic LC oscillation circuit. By reasonably controlling the energy control switch I, the charge on the piezoelectric element will be extracted to an inductance of the primary side of the transformer, and then the electric energy will be transferred to the energy storage capacitor by means of the energy control switch II. A typical technology reported based on this method is a synchronous charge extraction technology.

If the energy control switch is properly controlled, bidirectional energy control between the electromechanical conversion energy of the piezoelectric element and the electric energy of the energy storage module may be achieved by means of the bidirectional energy conversion function with the primary and secondary sides of the transformer, and finally, the energy collection role or the vibration suppression role is timely achieved. By taking the synchronous charge or optimized synchronous charge extraction interface control circuit implemented based on the flyback transformer as an example, in vibration suppression operation of the wind-induced vibration structure, vibration suppression is achieved mainly by controlling the energy control switch in the interface control circuit to switch a voltage phase of the piezoelectric element, excessive electric energy does not need to be input, and therefore, an increased gain of the power generation power by means of the vibration control of the wind-induced vibration structure is much greater than electric energy consumption required by the interface control circuit.

Figure 7:
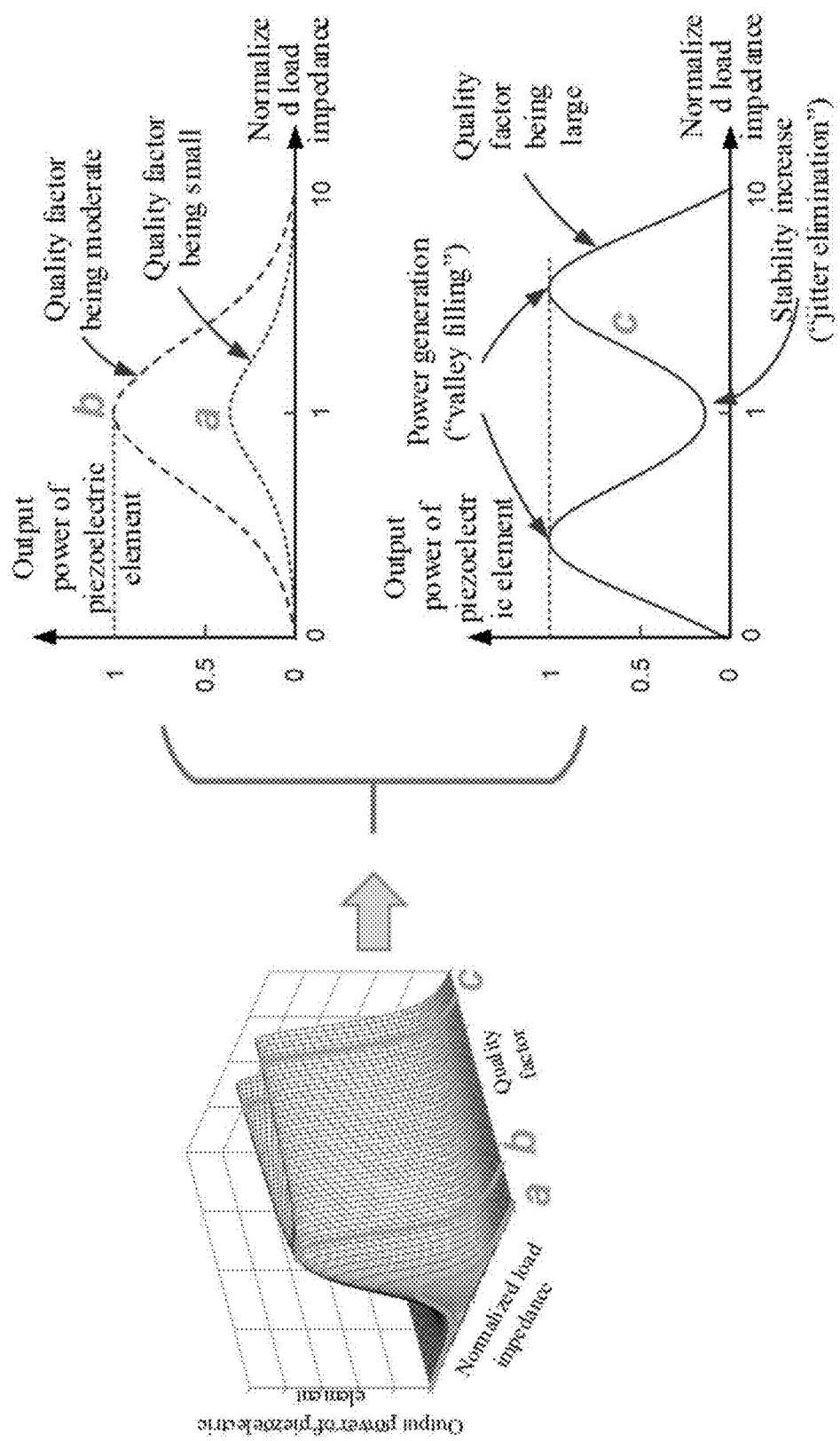
FIG. 7 is a working principle diagram for achieving structural vibration suppression of piezoelectric elements with different quality factors provided by an example of the present invention.

Moreover, for an electromechanical coupling structure containing the piezoelectric element, if a structural quality factor is assumed to be the product of a structural electromechanical coupling coefficient and a structural mechanical quality factor, and the larger the quality factor is, the larger the electromechanical coupling coefficient is. It is assumed that the piezoelectric element only outputs electric power to the outside, when the electromechanical coupling coefficient is small, the output electric power by the piezoelectric element by means of the electromechanical coupling is equivalent to introducing additional electrical damping to the vibration system, but in this case, the vibration amplitude of the structure is not significantly reduced, and therefore, when the load impedance is equal to the equivalent output impedance of the piezoelectric element, the output electric power during impedance matching is maximum. The maximum electric power increases along with increasing of the electromechanical coupling coefficient, and when the output electric power is half of the mechanical energy harvested by the structure, the output electric power is no longer increased. In this case, if the electromechanical coupling coefficient is further improved, the electrical damping effect introduced by means of the electromechanical conversion will significantly suppress the structural amplitude. In order to maximize the output electric power, the load impedance needs to be manually adjusted, and the electromechanical energy conversion of the piezoelectric element is properly reduced, that is, the electrical damping effect is reduced to obtain the theoretical maximum output power. According to the above principle, in this case, an impedance matching strategy is still used for making the electromechanical energy conversion of the piezoelectric element be in an optimal state, and the vibration amplitude of the structure containing the piezoelectric element is necessarily reduced. The basic working principle of achieving structural vibration suppression by using the piezoelectric element is derived from the phenomenon, and with reference to FIG. 7, the three curves of a, b and c represent the output power of the piezoelectric element under different quality factors (small, moderate and large) respectively. It may be seen that after the wind-induced vibration structure and the piezoelectric element are integrated, if the quality factor is large, two functions of power generation and vibration suppression may be necessarily achieved, and the amount of electric energy required to be additionally provided in a vibration control process is extremely small.

It should be noted that the above-mentioned working principle is derived based on a standard interface (passive rectifier bridge) circuit theory, and in order to achieve automatic switching of two functions, the quality factor of the structure should be greater than $\pi$, which is difficult to machine and obtain in an actual wind-induced vibration power generation structure. The synchronous charge extraction interface control circuit described above may greatly reduce the requirement on the quality factor: a theoretical calculation result indicates that when the structural quality factor is greater than $\pi/4$ under an action of the synchronous charge extraction interface control circuit, two functions of power generation or vibration suppression of the device may be implemented by means of the piezoelectric element, which lies in that in the synchronous charge extraction interface control circuit, there is an inductance that forms an LRC second-order resonance circuit together with the capacitor equivalent to the piezoelectric element. It is assumed that the quality factor of the resonance circuit is large enough, it may be considered that the overshoot of the second-order system is large enough, which is about twice a target value.

It should be noted that for the design of the structural quality factor, the volume of the wind-induced vibration structure and the volume of the piezoelectric element are regarded as a whole, and the quality factor may be changed by changing the volume fraction of the piezoelectric element, that is, if the piezoelectric element has a large volume fraction, the quality factor is also increased accordingly. The quality factor of the oscillation structure is increased (a constant damping ratio becomes small), and the coupled quality factor will be increased accordingly.

When the synchronous charge extraction technology is used for vibration control of the wind-induced vibration power generation structure, the interface control circuit and the energy storage module are disconnected, and the interface control circuit utilizes the second-order system characteristics of the LRC resonance circuit to make the LRC resonance circuit to only oscillate for half a cycle by means of the energy control switch in the interface control circuit, such that the phase of the voltage of the piezoelectric element jumps by 180°, and moreover, the amplitude of the voltage is increased by twice, which greatly increases electromechanical conversion energy of the element. Compared with a passive standard interface circuit, under the same electromechanical coupling coefficient, the electromechanical conversion energy in a single period may be at least improved by over 4 times, such that in order to achieve the effect of vibration suppression, the required structural quality factor may also be reduced by 4 times. If the structural quality factor is unchanged, the structure vibration control effect achieved by using the synchronous charge extraction interface circuit is more obvious.

By employing the above algorithm, the average power generation power of the hybrid power generating device is at a power level of $10^0$ to $10^2$ milliwatts, thereby providing a convenient and continuous power supply for a surrounding low-power-consumption passive sensing apparatus.

Those skilled in the art should understand that the examples of the present application may be provided as methods, systems, or computer program products, and therefore, the present application may employ full hardware examples, full software examples, or software and hardware combined examples. Moreover, the present application may take the form of a computer program product implemented on one or more computer usable storage media (including, but not limited to, disk memories, CD-ROM, optical memories, etc.) containing computer usable program codes.

The present application is described with reference to flowcharts and/or block diagrams of methods, devices (systems), and computer program products according to the examples of the present application. It should be understood that each flow and/or block in the flow diagrams and/or block diagrams and combinations of the flows and/or blocks in the flowcharts and/or block diagrams may be implemented by computer program instructions. These computer program instructions may be provided for a processor of a general-purpose computer, a special-purpose computer, an embedded processor, or other programmable data processing devices to produce a machine, such that instructions executed by the processor of the computer or other programmable data processing devices produce an apparatus used for implementing functions specified in one or more flows of the flowcharts and/or one or more blocks of the block diagrams.

These computer program instructions may also be stored in a computer readable memory that may guide a computer or other programmable data processing devices to work in a specific manner, such that the instructions stored in the computer readable memory produce an article of manufacture including an instruction device, and the instruction device implements functions specified in one or more flows of the flowcharts and/or one or more blocks of the block diagrams.

These computer program instructions may be loaded onto a computer or another programmable data processing device, such that a series of operations and steps are performed on the computer or another programmable device, thereby generating computer-implemented processing.

Therefore, the instructions executed on the computer or another programmable device provide steps for implementing a specific function in one or more flows of the flowcharts and/or in one or more blocks of the block diagrams.

Finally, it should be noted that the above-mentioned examples are merely intended for description of the technical solutions of the present invention rather than limitation to the present invention. Although the present invention is described in detail with reference to the above-mentioned examples, those of ordinary skill in the art should understand that they may still make modifications or equivalent replacements to the technical solutions of the present invention without departing from the spirit and scope of the technical solutions of the present invention, all of which should be encompassed within the protection scope of the claims of the present invention.

What is claimed is:

1. A micro-power wind-solar hybrid energy harvesting and power generating device, comprising a solar power generation module, a wind power generation module, a control module, an energy storage module, and an accessory structure, wherein
    the wind power generation module comprises a piezoelectric element, a wind-induced vibration structure in a hollow blunt body form, and a wind-induced vibration structure interface control circuit, the piezoelectric element is connected to the wind-induced vibration structure interface control circuit by means of positive and negative wires;
    the solar power generation module comprises a solar cell and a solar cell interface control circuit connected to the solar cell;
    the wind-induced vibration structure interface control circuit and the solar cell interface control circuit are both connected to the energy storage module, and the energy storage module is configured to store electric energy generated by the solar power generation module and the wind power generation module;
    the solar cell is mounted on a surface of the wind-induced vibration structure, and the wind-induced vibration structure interface control circuit, the solar cell interface control circuit, the control module, and the energy storage module are all mounted inside the wind-induced vibration structure;
    the accessory structure is configured to fixedly mount the micro-power wind-solar hybrid energy harvesting and power generating device on an overhead transmission line tower; and
    the control module is connected to the energy storage module and the wind-induced vibration structure interface control circuit, and the control module is configured to control a working mode of the piezoelectric element,
    wherein the wind power generation module further comprises a cantilever beam structure,
    wherein the wind-induced vibration structure and a free end of the cantilever beam structure are connected and fixed, and the piezoelectric element is arranged at a clamping end of the cantilever beam structure and is adhered and integrated on a surface of the cantilever beam structure in an adhesive manner.

2. The micro-power wind-solar hybrid energy harvesting and power generating device according to claim 1, wherein the solar cell is a solar thin film cell.

3. The micro-power wind-solar hybrid energy harvesting and power generating device according to claim 2, wherein the solar thin film cell is mounted on a top plane and/or a side curved surface of the wind-induced vibration structure.

4. The micro-power wind-solar hybrid energy harvesting and power generating device according to claim 1, wherein the accessory structure comprises a wind vane, a rotating mechanism and a clamping and fixing mechanism,
    the wind vane and the rotating mechanism are configured to make a neutral surface of a cantilever beam always parallel to an incoming flow direction,
    the clamping and fixing mechanism is connected to the cantilever beam structure, and the clamping and fixing mechanism is configured to fixedly mount the cantilever beam structure on the overhead transmission line tower.

5. The micro-power wind-solar hybrid energy harvesting and power generating device according to claim 1, wherein a cross section of the wind-induced vibration structure in the hollow blunt body form employs any one of the following forms: a circle, a square, a rectangle and a semicircle.

6. The micro-power wind-solar hybrid energy harvesting and power generating device according to claim 1, wherein the energy storage module is of a rechargeable battery.

7. The micro-power wind-solar hybrid energy harvesting and power generating device according to claim 1, wherein the energy storage module is a supercapacitor, and the supercapacitor performs standard voltage output by means of a DC/DC voltage regulator.

8. The micro-power wind-solar hybrid energy harvesting and power generating device according to claim 1, wherein the wind-induced vibration structure interface control circuit comprises an energy control switch I and a transformer which are connected in series, and the piezoelectric element forms a series loop with the energy control switch I and the transformer by means of positive and negative wires; and
    a secondary side of the transformer is connected to the energy storage module, and the energy storage module comprises an energy control switch II and the supercapacitor connected in series.

9. The micro-power wind-solar hybrid energy harvesting and power generating device according to claim 8, wherein the control module is configured to:
    switch a voltage phase of the piezoelectric element by controlling the energy control switch I and the energy control switch II, such that the piezoelectric element achieves switching between an energy collection mode and a mode of suppressing vibration of the wind-induced vibration power generation structure.

10. A hybrid energy harvesting method, adapted to the micro-power wind-solar hybrid energy harvesting and power generating device according to claim 9, comprising:
    controlling the energy control switch I and the energy control switch II to be turned on, such that the piezoelectric element is switched to the energy collection mode, and extracting and storing electric energy of the wind power generation module by means of an electromechanical coupling effect of the piezoelectric element;
    controlling the energy control switch I to be turned on, and controlling the energy control switch II to be turned off, such that the voltage phase of the piezoelectric element jumps by 180°, and the piezoelectric element is switched into the mode of suppressing vibration of the wind-induced vibration power generation structure; and extracting and storing electric energy of the solar power generation module by means of the solar cell interface control circuit.

11. The hybrid energy harvesting method according to claim 10, wherein the solar cell interface control circuit extracts the electric energy by using a maximum power point tracking algorithm and stores the electric energy in the energy storage module.

12. The hybrid energy harvesting method according to claim 10, wherein the wind-induced vibration structure interface control circuit extracts the electric energy by using a synchronous charge extraction algorithm and stores the electric energy in the energy storage module.

* * * * *